(12) United States Patent
Chrisop et al.

(10) Patent No.: US 8,370,299 B2
(45) Date of Patent: Feb. 5, 2013

(54) METHODS AND SYSTEMS FOR PRINT JOB HANDLING

(75) Inventors: Roy K. Chrisop, Camas, WA (US); Ronnie Neil Patton, Lake Oswego, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 835 days.

(21) Appl. No.: 11/564,722

(22) Filed: Nov. 29, 2006

(65) Prior Publication Data

US 2008/0126392 A1 May 29, 2008

(51) Int. Cl.
*G06F 17/30* (2006.01)
(52) U.S. Cl. ...................................... 707/621
(58) Field of Classification Search .................. 707/1, 2, 707/10, 621, 975; 358/1.15; 717/178; 710/15
See application file for complete search history.

(56) References Cited

U.S. PATENT DOCUMENTS

| | | | | |
|---|---|---|---|---|
| 5,615,015 A | * | 3/1997 | Krist et al. | 358/296 |
| 5,619,649 A | * | 4/1997 | Kovnat et al. | 358/1.15 |
| 5,715,381 A | * | 2/1998 | Hamilton | 358/1.15 |
| 5,758,144 A | * | 5/1998 | Eberhard et al. | 707/2 |
| 5,764,983 A | * | 6/1998 | Chew et al. | 707/205 |
| 5,930,465 A | * | 7/1999 | Bellucco et al. | 358/1.15 |
| 6,003,022 A | * | 12/1999 | Eberhard et al. | 707/2 |
| 6,049,391 A | * | 4/2000 | Farrell | 358/1.15 |
| 6,151,131 A | * | 11/2000 | Pepin et al. | 358/1.13 |
| 6,716,102 B2 | * | 4/2004 | Whitten et al. | 463/43 |
| 6,754,811 B1 | * | 6/2004 | Cato et al. | 712/227 |
| 6,772,252 B1 | * | 8/2004 | Eichler et al. | 710/104 |
| 6,850,257 B1 | * | 2/2005 | Colleran et al. | 715/804 |
| 7,423,776 B2 | | 9/2008 | Murata | |
| 7,441,108 B2 | * | 10/2008 | Fisher et al. | 712/227 |
| 7,447,821 B2 | * | 11/2008 | Ferchau et al. | 710/301 |
| 7,533,116 B2 | * | 5/2009 | Lacy | 707/102 |
| 7,555,573 B2 | * | 6/2009 | Cummins et al. | 710/15 |
| 7,620,952 B2 | * | 11/2009 | Havemose | 718/104 |
| 7,649,522 B2 | * | 1/2010 | Chen et al. | 345/156 |
| 2005/0068560 A1 | | 3/2005 | Ferlitsch | |
| 2005/0068564 A1 | | 3/2005 | Ferlitsch | |
| 2005/0105129 A1 | * | 5/2005 | Takahashi | 358/1.15 |
| 2005/0246710 A1 | | 11/2005 | McLuckie et al. | |

(Continued)

FOREIGN PATENT DOCUMENTS

JP  07-061054 A  3/1995
JP  2001-014152 A  1/2001

(Continued)

OTHER PUBLICATIONS

Chinese Patent Application No. 2007101960200—First Office Action—Dated Jun. 26, 2009.

(Continued)

*Primary Examiner* — Jean M Corrielus
(74) *Attorney, Agent, or Firm* — Kristine Elizabeth Matthews; David C. Ripma (57) ABSTRACT

Embodiments of the present invention comprise systems and methods for print job handling using a portable document system residing on a portable memory device.

21 Claims, 7 Drawing Sheets

U.S. PATENT DOCUMENTS

| | | | |
|---|---|---|---|
| 2005/0248800 A1 | 11/2005 | Choi | |
| 2005/0275864 A1 | 12/2005 | Sugimura et al. | |
| 2006/0023238 A1* | 2/2006 | Blaszyk et al. | 358/1.13 |
| 2006/0023240 A1 | 2/2006 | Natori | |
| 2006/0055975 A1 | 3/2006 | Toda | |
| 2006/0197977 A1* | 9/2006 | Miyata | 358/1.15 |
| 2008/0244567 A1* | 10/2008 | Zhan | 717/178 |
| 2009/0067008 A1* | 3/2009 | Kodimer et al. | 358/402 |
| 2009/0070492 A1* | 3/2009 | Kodimer et al. | 710/15 |
| 2009/0129591 A1* | 5/2009 | Hayes et al. | 380/51 |

FOREIGN PATENT DOCUMENTS

| | | |
|---|---|---|
| JP | 2004-046802 A | 2/2004 |
| JP | 2005-275483 A | 10/2005 |
| JP | 2006-011807 A | 1/2006 |

OTHER PUBLICATIONS

Japanese Patent Application No. 2007-242891—Office action—Mailing date Feb. 23, 2010.

* cited by examiner

METHODS AND SYSTEMS FOR PRINT JOB HANDLING

FIELD OF THE INVENTION

Embodiments of the present invention comprise methods and systems for print job handling.

BACKGROUND

Exchange of documents with a print provider for printing may be difficult to accomplish for several reasons. One reason may be that the size of files containing the document may exceed the storage capacity of exchange media such as compact discs, may exceed electronic mailbox limitations, and may take a long time to transmit over a network. Additionally, there may be file security issues associated with the copying of documents files. Other difficulties may arise when a print provider needs to revise a print job and does not have access to the applications and source data required to perform the revisions. In some cases, a print provider may not have compatible versions of applications required to access the print job.

SUMMARY

Some embodiments of the present invention comprise methods and systems for print job handling using a portable document system residing on a portable memory device.

The foregoing and other objectives, features, and advantages of the invention will be more readily understood upon consideration of the following detailed description of the invention taken in conjunction with the accompanying drawings.

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

An electronic-document creation process may involve a document creator. In some embodiments of the present invention, the document creator may need to locate previously-prepared, electronic, document input, for example, digital files and images, for incorporation into a document. In other embodiments, the document creator may need to locate and scan previously-prepared, hardcopy, document input. In alternative embodiments, the document creator may generate text and graphics as part of a document. The document creator may assemble an electronic document from these, and other, assorted constituent pieces.

Assembling the electronic document may comprise, in some embodiments, running one or more desktop publishing applications, for example, Adobe® FrameMaker®, Adobe® InDesign®, Adobe® PageMaker®, Corel® Venture®, Microsoft® Office Publisher®, QuarkXPress®, Serif® PagePlus®, Deneba® Canvas®, SOHO® The Print Shop®, SOHO® PrintMaster®, SOHO® PrintArtist®, Calendar Creator®, Greeting Card Factory®, American Greetings® Createacard®, and Hallmark® Card Studio®. Alternatively or additionally, document assembly may comprise running one or more document generating applications such as Microsoft® Word®, Excel®, and PowerPoint®, and Corel® WordPerfect®.

In some embodiments, once the electronic document has been created in application format, the electronic document may be converted to a format, such as Portable Document Format (PDF) or an Extensible Markup Language (XML)—based format including, but not limited to, Microsoft® XML Paper Specification (XPS) and Adobe® Mars®, for printing. The print-formatted electronic document then may be transferred to a storage medium for archival or for transfer and submission to a print provider. Alternatively, an electronic document may be transferred in application format to a storage medium for archival or for transfer and submission to a print provider. Exemplary print providers include copy/print shops and kiosk printing locations.

The electronic document may be transferred, for example, to a compact disc (CD), or several CDs depending on the size of the electronic document, and the CD(s) may be sent to a print provider. In another example, the electronic document may be transferred by File Transfer Protocol (FTP) over an intranet or the Internet or by electronic mail (email) to a print provider. In still another example, the electronic document may be stored on a hard disk drive for archival and subsequent transfer to a print provider. Submission of the electronic document to a print provider may require a job ticket which may comprise user/account information, delivery information, or printing parameters. Large electronic document files may require multiple CDs, may overrun an electronic mailbox size limitation or email attachment size limitation, or may take an unacceptably long time to transmit over an intranet or the Internet.

After receiving the electronic document and the job ticket, the print provider may estimate the print-job cost and may revise the job ticket if necessary. The print provider may then open and process the file(s) containing the electronic document. Processing the file(s) may comprise running applications and accessing print drivers. The printed job may be delivered to the customer.

Estimation of the print-job cost and revision of the job order may be a lengthy process. Additionally, changes to the electronic document may be difficult to effectuate at the print provider where the constituent pieces of the electronic document may be unavailable. Reconstruction of a single electronic document from multiple CDs may also be difficult and time consuming. The print provider may not have the same version(s) of the application(s) used to generate the electronic document, and in some cases, the print provider may not have the same application(s) used to generate the electronic document. Further difficulties may arise when problems with the file(s) containing the electronic document are not apparent until the job has been printed. There may arise the necessity to generate a new electronic document at the customer site in order to compensate for any of the above-mentioned difficulties.

Some embodiments of the present invention comprise a portable document system (PDS) that may reside on a portable memory device, for example a Universal Serial Bus (USB) flash memory device. In some embodiments of the present invention, the PDS may use the U3 USB device standard. In alternate embodiments of the present invention, the PDS may use the Microsoft® Vista® Mobile Desktop.

Figure 1:
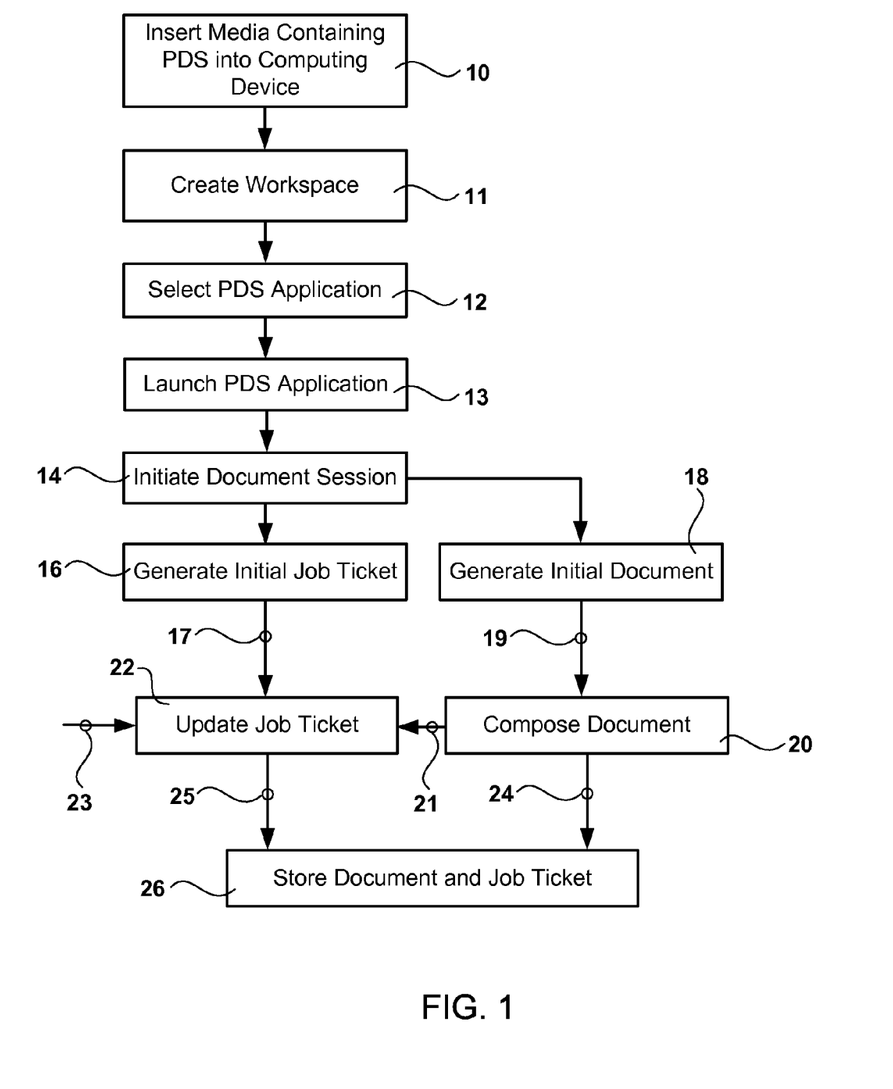
FIG. 1 is a drawing showing embodiments of the present invention comprising a portable document system residing on a portable memory device.

Some embodiments of the present invention are shown in FIG. 1. When a user inserts a portable memory device containing a PDS into a computing device 10, a workspace may be created 11, for example, a Windows® desktop, that may access the PDS application that resides on the portable memory device. Exemplary computing devices may include a personal computer, a network computer, and a multi-function peripheral. The user may select the PDS application 12 causing the PDS application to launch 13. The user may then initiate a document session 14. A document session may be a session in which a user creates an electronic document or further processes a previously generated electronic document. Upon initiation of the document session 14, the PDS application may generate 16 an initial job ticket 17, and the PDS application may generate 18 an initial electronic document 19.

In some embodiments of the present invention, the initial electronic document 19 may be a blank document for editing and composition by the user. In alternative embodiments, the initial electronic document 19 may be a document of default content or format. In still alternative embodiments, the user may select the initial electronic document type during the document session initiation 14. In some embodiments of the present invention, the initial job ticket 17 may contain information known to the system at the initiation of the document session, for example the date and time. In alternative embodiments, the initial job ticket 17 may be blank.

As the user composes the electronic document 20 using assorted applications and source files, the job ticket may be updated 22 to reflect document-specific information 21. Exemplary document-specific information 21 may include information about the applications used to generate the electronic document, including application name and version, information about document characteristics including number of pages and color content, and information about source files. In some embodiments of the present invention, the applications used to generate the electronic document may reside on the portable memory device. In alternate embodiments of the present invention, the applications used to generate the electronic document may be copied to the portable memory device.

In some embodiments of the present invention, source files used in the composition of the electronic document may be copied to the portable memory device on which the PDS resides. Source files may be in any format. For example, image source files may be in JPEG, JPEG-2000, JPEG-LS, BMP, TIFF, or any other image format. In these embodiments, the job ticket may be updated with document-specific information 21 related to the source files, such as information describing the name, size, and location on the portable memory device of the source files.

The user may also update the job ticket 22. Exemplary input from the user 23 may include print-job requirements such as the number of sets of the electronic document the user would like printed, double-sided/single-sided preference, color/black-and-white preference, paper-orientation preference, paper-size preference, binding options, etc. The completed electronic document 24 and job ticket 25 may be stored 26 on the portable memory device.

In some embodiments of the present invention, an accounting application may be invoked to add payment and accounting information to a job ticket. Exemplary payment and accounting information may include billing addresses, credit card information, and responsible party information.

Figure 2:
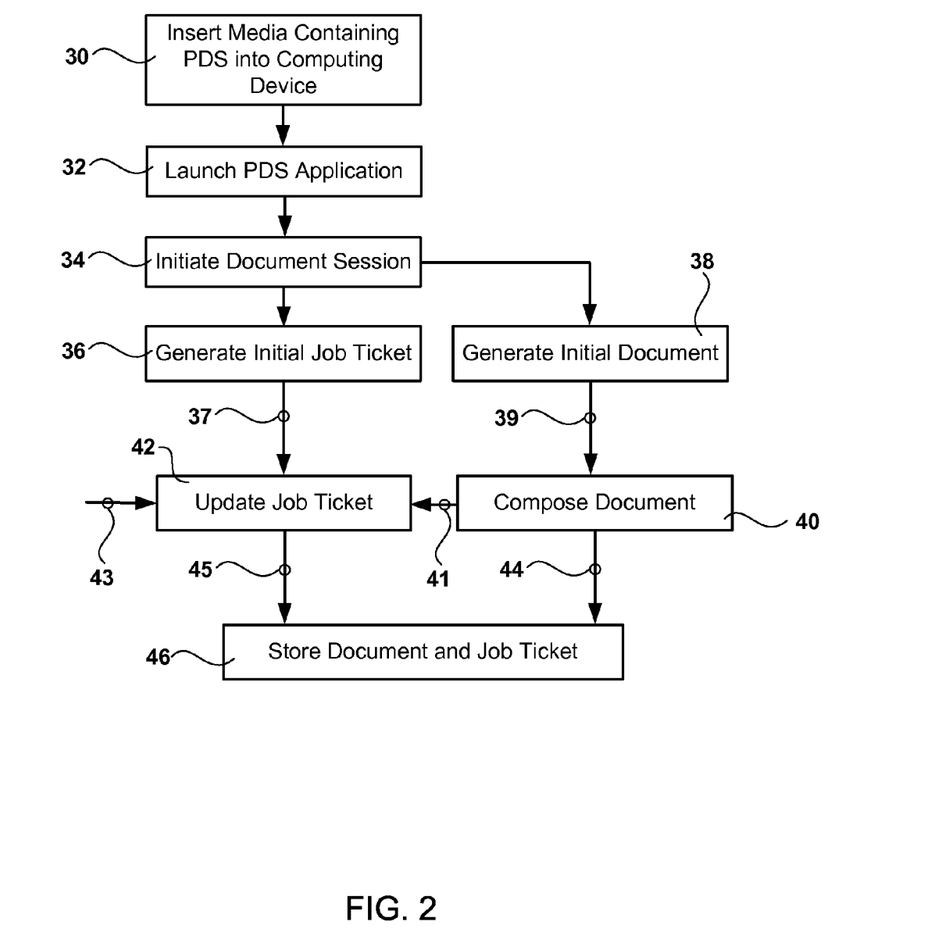
FIG. 2. is a drawing showing embodiments of the present invention comprising automatic launch of a portable document system residing on a portable memory device upon insertion of the portable memory device in a computing device.

In alternate embodiments of the present invention shown in FIG. 2, after insertion of the portable memory device containing a PDS 30 into a computing device, the PDS application may launch automatically 32. A user may then initiate a document session 34, and an initial job ticket 37 may be generated 36, and an initial electronic document 39 may be generated 38.

In some embodiments of the present invention, the initial electronic document 39 may be a blank document for editing and composition by the user. In alternative embodiments, the initial electronic document 39 may be a document of default content or format. In still alternative embodiments, the user may select the initial electronic document type during the document session initiation 34. In some embodiments of the present invention, the initial job ticket 37 may contain information known to the system at the initiation of the document session, for example the date and time. In alternative embodiments, the initial job ticket 37 may be blank.

As the user composes the electronic document 40 using assorted applications and source files, the job ticket may be updated 42 to reflect document-specific information 41. Exemplary document-specific information 41 may include information about the applications used to generate the electronic document, including application name and version, information about document characteristics including number of pages and color content, and information about source files.

In some embodiments of the present invention, the applications used to generate the electronic document may reside on the portable memory device. In alternate embodiments of the present invention, the applications used to generate the electronic document may be copied to the portable memory device.

In some embodiments of the present invention, source files used in the composition of the electronic document may be copied to the portable memory device on which the PDS resides. Source files may be in any format. For example, image source files may be in JPEG, JPEG-2000, JPEG-LS, BMP, TIFF, or any other image format. In these embodiments, the job ticket may be updated with document-specific information 41 related to the source files, such as information describing the name, size, and location on the portable memory device of the source files.

The user may also update the job ticket 42. Exemplary input from the user 43 may include print-job requirements such as the number of sets of the electronic document the user would like printed, double-sided/single-sided preference, color/black-and-white preference, paper-orientation preference, paper-size preference, binding options, etc.

In some embodiments of the present invention, an accounting application may be invoked to add payment and accounting information to a job ticket. Exemplary payment and accounting information may include billing addresses, credit card information, and responsible party information.

The completed electronic document 44 and job ticket 45 may be stored 46 on the portable memory device. In alternative embodiments, the electronic document may be printed, according to preferences and parameters indicated in the job ticket, to a spool file which may be stored on the portable memory device.

Figure 3:
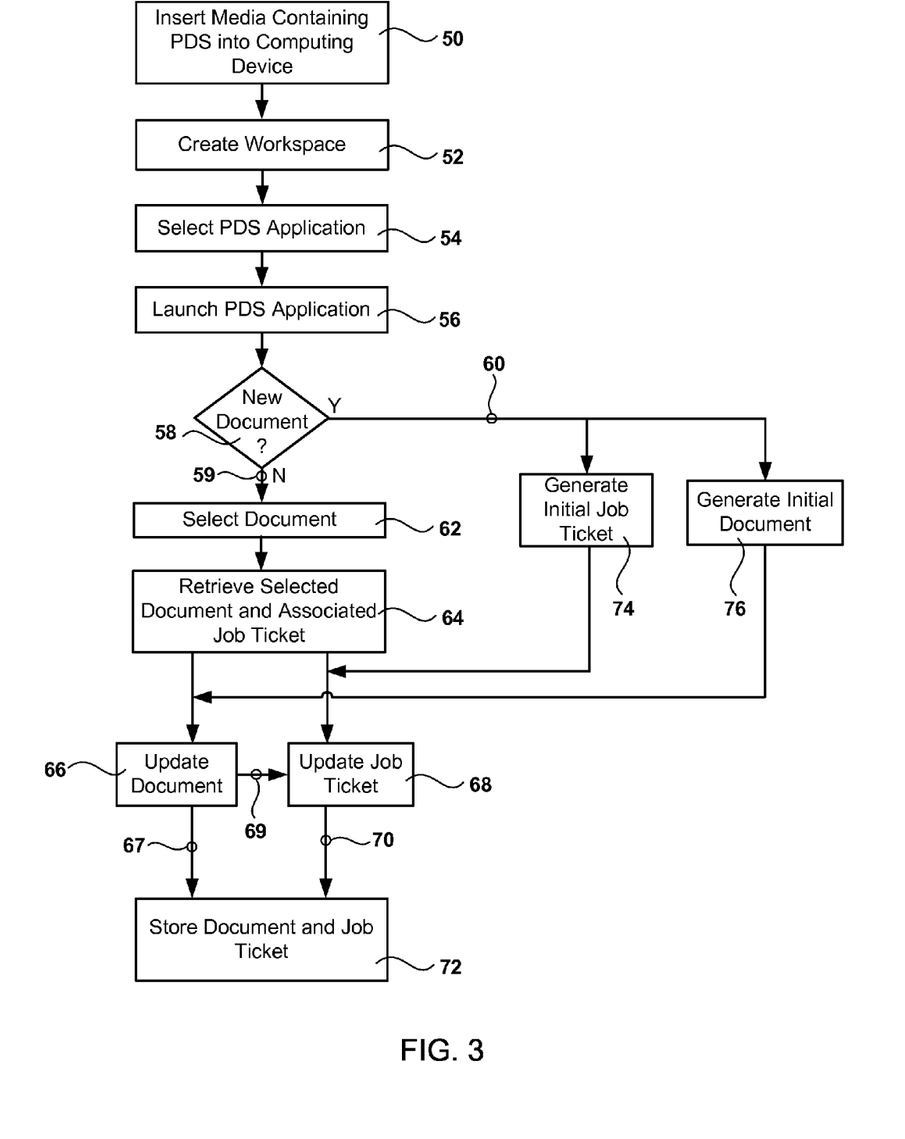
FIG. 3 is a drawing showing embodiments of the present invention comprising document processing using a portable document system residing on a portable memory device.

Some embodiments of the present invention are shown in FIG. 3. When a user inserts a portable memory device containing a PDS into a computing device 50, a workspace may be created 52, for example a Windows® desktop, that may access the PDS application that resides on the portable memory device. The user may select to run the PDS application 54. In alternate embodiments of the present invention, after insertion of the portable memory device containing a PDS into a computing device, the PDS application may launch automatically.

Upon launch of the PDS application 56, the PDS application may query the user 58 to determine if they are editing an existing electronic document 59 or opening a new electronic document 60. If the user is editing an existing electronic document 59, the PDS application may query to user to identify the electronic document they wish to edit 62. The electronic document may then be retrieved along with the associated job ticket 64. If the user is opening a new electronic document 60, an initial job ticket may be generated 74, and an initial electronic document may be generated 76.

In some embodiments of the present invention, the initial document may be a blank electronic document for editing and composition by the user. In alternative embodiments, the initial electronic document may be a document of default content or format. In still alternative embodiments, the user may select the initial electronic document type.

In some embodiments of the present invention, the initial job ticket may contain information known to the system when the initial job ticket and electronic document are generated, for example the date and time. In alternative embodiments, the initial job ticket may be blank. The electronic document, initial or retrieved, may be edited 66 by the user, and the job ticket, initial or retrieved, may be edited 68 by the user.

Changes in the electronic document may effectuate updates 69 in the job ticket. As the user composes or edits the electronic document using assorted applications and source files, the job ticket may be updated to reflect document-specific information. Exemplary document-specific information may include information about the applications used to generate the electronic document, including application name and version, information about document characteristics including number of pages and color content, and information about source files.

In some embodiments of the present invention, the applications used to generate the electronic document may reside on the portable memory device. In alternate embodiments of the present invention, the applications used to generate the electronic document may be copied to the portable memory device.

In some embodiments of the present invention, source files used in the composition of the electronic document may be copied to the portable memory device on which the PDS resides. Source files may be in any format. For example, image source files may be in JPEG, JPEG-2000, JPEG-LS, BMP, TIFF, or any other image format. In these embodiments, the job ticket may be updated with document-specific information related to the source files, such as information describing the name, size, and location on the portable memory device of the source files.

The user may also update the job ticket. Exemplary input from the user may include print-job requirements such as the number of sets of the electronic document the user would like printed, double-sided/single-sided preference, color/black-and-white preference, paper-orientation preference, paper-size preference, binding options, etc.

In some embodiments of the present invention, an accounting application may be invoked to add payment and accounting information to a job ticket. Exemplary payment and accounting information may include billing addresses, credit card information, and responsible party information.

The document 67 and the job ticket 70 may be stored 72 on the portable memory device. In alternative embodiments, the electronic document may be printed, according to preferences and parameters indicated in the job ticket, to a spool file which may be stored on the portable memory device.

Figure 4:
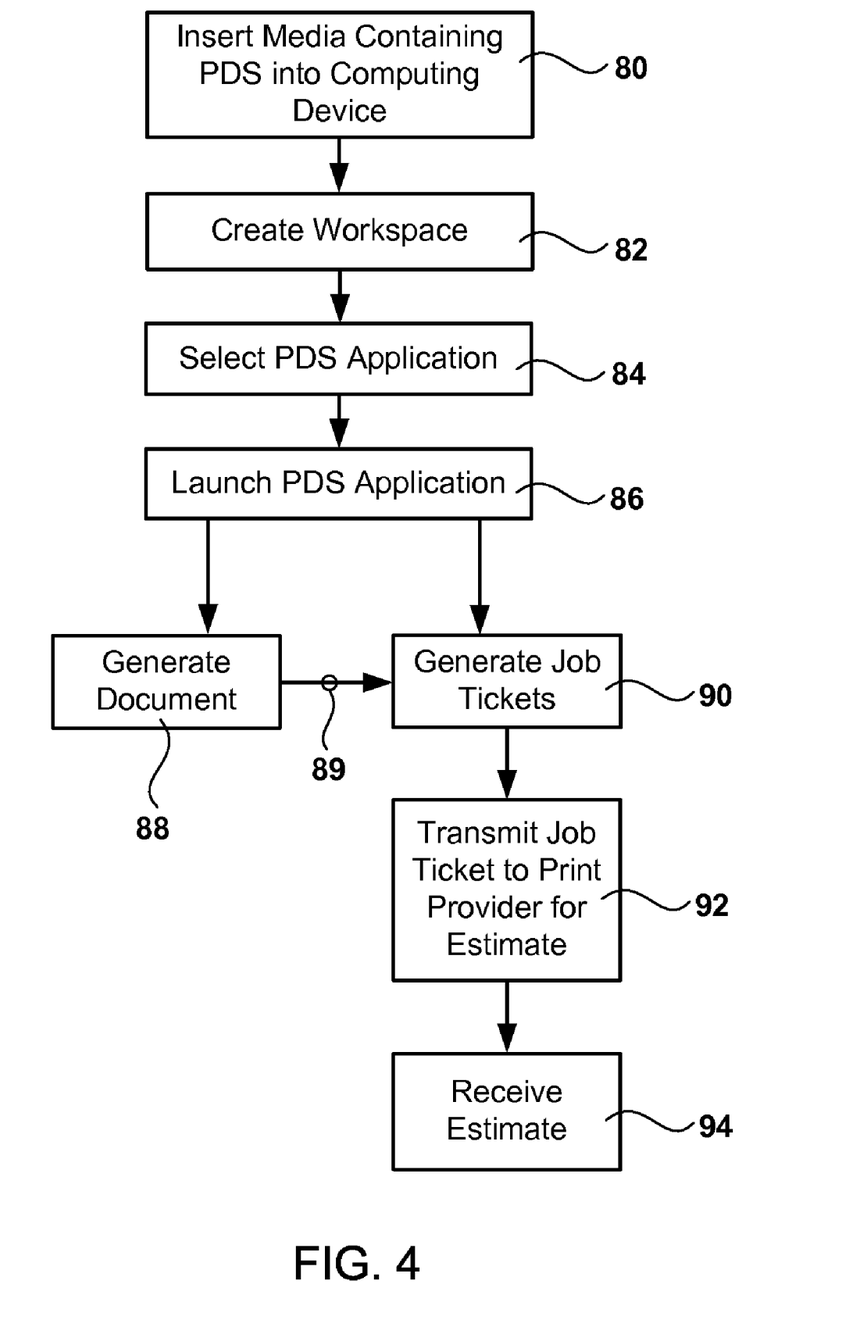
FIG. 4 is a drawing showing embodiments of the present invention comprising obtaining an estimate of a job cost from a print provider based on a job ticket generated using a portable document processing system residing on a portable memory device.

In some embodiments of the present invention shown in FIG. 4, when a user inserts a portable memory device containing a PDS into a computing device 80, a workspace may be created 82, for example a Windows® desktop, that may access the PDS application that resides on the portable memory device. The user may select to run the PDS application 84. In alternate embodiments of the present invention, after insertion of the portable memory device containing a PDS into a computing device, the PDS application may launch automatically. Upon launch of the PDS application 86, the electronic document may be generated 88 and an associated job ticket may be generated 90.

The job ticket may be sent 92 to a print provider for estimation of the job cost. The cost estimate may be sent back to the PDS 94, and the user may modify the job ticket based on the estimate. In alternate embodiments, a job estimator may reside on the PDS.

In some embodiments of the present invention, the job ticket may comprise information regarding an application used in the generation of a document associated with the job ticket. Exemplary information may include the application name and version number. In some embodiments, the job ticket may comprise a link to the location of an application on the portable memory device. In alternate embodiments, the link may be to a location from which the application may be obtained or otherwise accessed. In some embodiments of the present invention, source material required by an application in the generation of the document may be linked to the application through the job ticket. In some embodiments, document composition or layout information may be linked to an application through the job ticket.

In an exemplary embodiment, the job ticket may comprise a data structure indexed by page number or page grouping. An entry in the data structure corresponding to an index may comprise a link to an application used in the generation of the page or pages corresponding to the index. The link may comprise the name of the application or a location from which the application may be accessed. An entry may further comprise the version number of the application and a link, or links, to raw source data required by the application in the generation of the indexed page or pages. Additionally, an entry may comprise printing information, such as, but not limited to, paper orientation, paper size, color attributes, specific to the indexed page or pages.

In an alternate exemplary embodiment, the job ticket may comprise a data structure indexed by a plurality of supported applications. An entry in the data structure corresponding to an index may comprise the version number of the index application. An entry may further comprise a link to a location from which the application may be invoked. Further, an entry may comprise an enumeration of the pages of the document to which the application is relevant. An application may be relevant to a document page if the application is required in the generation of the page. An entry may have a link to, or other identification of, source material required by the application in the generation of the document. An entry may comprise printing information, such as, but not limited to, paper orientation, paper size, color attributes, specific to the indexed application.

The portable memory device containing the PDS application may be taken by the user to a print provider. In some embodiments of the present invention shown in FIG. 5, the portable memory device may be inserted 100 into a computing device on the print provider's network. Upon insertion 100 of the portable memory device into the computing device, a workspace may be created 102, for example a Windows® desktop, that may access the PDS application that resides on the portable memory device. The operator at the print provider may select the PDS application 104 causing the PDS application to launch 106. In alternative embodiments, the PDS application may automatically launch upon insertion of the portable memory device into the computing device. The operator may then initiate a print session 108. After initiation of the print session 108, the operator may access the document and the job ticket 110 and print the job 112.

Figure 5:
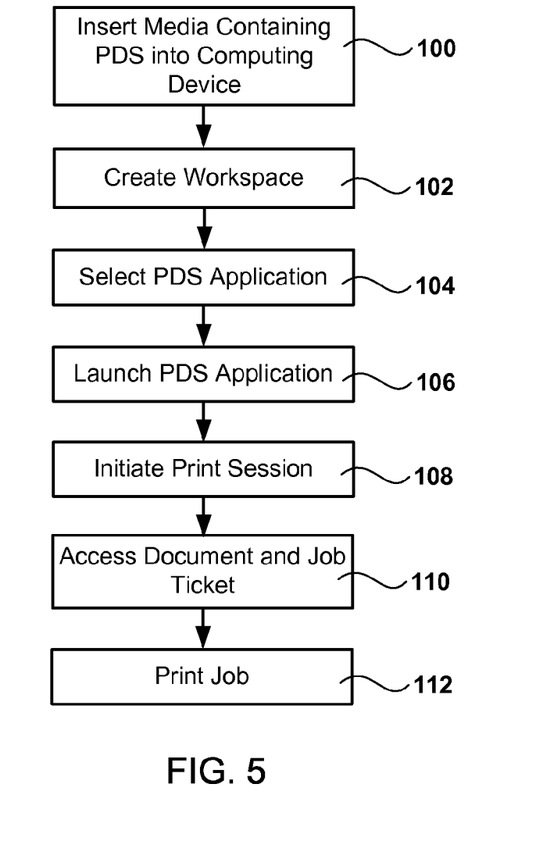
FIG. 5 is a drawing showing embodiments of the present invention comprising printing a print job at a print provider from a portable document processing system residing on a portable memory device.

In some embodiments of the present invention, the PDS application may access and interpret the job ticket 110 in order to recreate or generate portions of the document for printing. In some embodiments, an application identified in the job ticket 110 may be invoked and source data linked to the application via the job ticket 110 may be supplied to the application, thereby generating a portion of the document. This portion of the document may be printed and subsequent portions generated and printed in turn. In alternative embodiments, each portion may be spooled, and the completed document may be printed.

Figure 6:
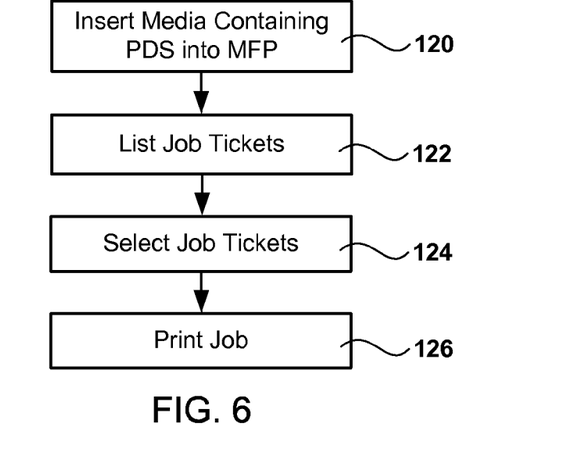
FIG. 6 is a drawing showing embodiments of the present invention comprising printing a print job from a portable document processing system residing on a portable memory device inserted into an MFP.

In alternate embodiments of the present invention, the portable memory device containing the PDS application may be inserted into a multi-function peripheral (MFP). An exemplary embodiment in which the portable memory device containing the PDS application is inserted into an MFP may be shown in FIG. 6. The portable media device containing the PDS application may be inserted into an MFP 120. A list of job tickets residing on the portable memory device may be displayed on the MFP front-panel display 122. A job ticket for processing may be selected 124, and the job associated with the ticket may be performed 126.

If difficulties are encountered in completing a job at the print provider, the PDS application and document generation information including source files and applications residing on the portable memory device may be used to reprocess the document.

In some embodiments of the present invention, source material related to a document on the portable memory device may be copy protected. In alternative embodiments, source material related to a document on the portable memory device may be unprotected.

Some embodiments of the present invention comprise a portable memory device pre-configured with a PDS that may be furnished to an end user by a print provider. Exemplary content of the pre-configured portable memory device includes software, forms, profiles, templates, source data, preferences, and applications. In alternative embodiments, an end user may download the PDS from a print provider access location to a portable memory device. Exemplary content of the download includes software, forms, profiles, templates, source data, preferences, and applications.

In some embodiments of the present invention, a portable memory device may be pre-configured with a PDS that may be application specific. Exemplary applications include applications for generating greeting cards, calendars, and applications for scrapbooks. The portable memory device may be connected to any computing or input/output device that supports the portable memory device. For example, the portable memory device may be a USB device. The user may connect the portable memory device to a digital camera with a USB slot. The user may then download source material, for example, digital photographs, into templates in the PDS.

In some embodiments of the present invention, a PDS application resident on a portable memory device may not contain document-creation applications. In these embodiments, the portable memory device may be inserted into a supporting computing device including an MFP, and document-creation applications resident on the computing device may be used to effectuate creation of the document. In alternative embodiments, document-creation applications may not be resident on the computing device, but may be accessible to the computing device from a server via a connection. A job ticket associated with the created document may be generated using the PDS application, and the job may then be submitted locally or taken on the portable memory device to a print provider.

Figure 7:
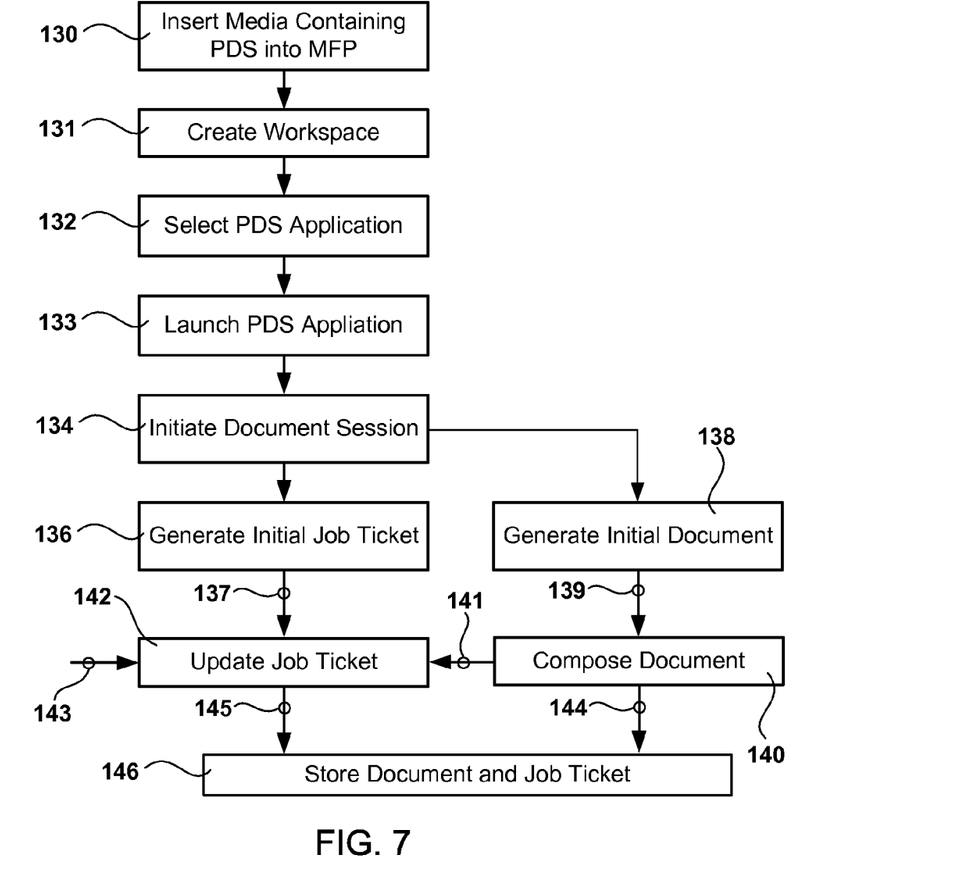
FIG. 7 is a drawing showing embodiments of the present invention comprising document and print job generation at an MFP using a portable document system residing on a portable memory device.

In some embodiments of the present invention illustrated in FIG. 7, a document may be created at an MFP using resident applications. The portable memory device may be inserted into the MFP 130. A workspace may be created 131 on the MFP. The PDS application may be selected 132 and subsequently launched 133. In alternate embodiments of the present invention, after insertion of the portable memory device containing a PDS into an MFP, the PDS application may launch automatically. A document session may be initiated 134. A document session may be a session in which a user creates an electronic document or further processes a previously generated electronic document. Upon initiation of the document session 134, the PDS application may generate 136 an initial job ticket 137, and the PDS application may generate 138 an initial electronic document 139.

In some embodiments of the present invention, the initial electronic document 139 may be a blank document for editing and composition by the user. In alternative embodiments, the initial electronic document 139 may be a document of default content or format. In still alternative embodiments, the user may select the initial electronic document type during the document session initiation 134. In some embodiments of the present invention, the initial job ticket 137 may contain information known to the system at the initiation of the document session, for example the date and time. In alternative embodiments, the initial job ticket 137 may be blank.

As the user composes the electronic document 140 using assorted applications and source files, the job ticket may be updated 142 to reflect document-specific information 141. Exemplary document-specific information 141 may include information about the applications used to generate the electronic document, including application name and version, information about document characteristics including number of pages and color content, and information about source files. In some embodiments of the present invention, the applications used to generate the electronic document may reside on the portable memory device. In alternate embodiments of the present invention, the applications used to generate the electronic document may be copied to the portable memory device.

The job ticket may be updated with document-specific information 141 related to the source files, such as information describing the name, size, and location on the portable memory device of the source files. The user may also update the job ticket 142 through the front panel on the MFP. Exemplary input from the user 143 may include print-job requirements such as the number of sets of the electronic document the user would like printed, double-sided/single-sided preference, color/black-and-white preference, paper-orientation preference, paper-size preference, binding options, etc.

In some embodiments of the present invention, an accounting application may be invoked to add payment and accounting information to a job ticket. Exemplary payment and accounting information may include billing addresses, credit card information, and responsible party information.

The completed electronic document 144 and job ticket 145 may be stored 146 on the portable memory device. The resulting job may be printed locally on the MFP. In alternate embodiments, the portable memory device containing the print job may be submitted to a print provider for printing of the job. In still alternative embodiments, the electronic document may be printed, according to preferences and parameters indicated in the job ticket, to a spool file which may be stored on the portable memory device.

Figure 8:
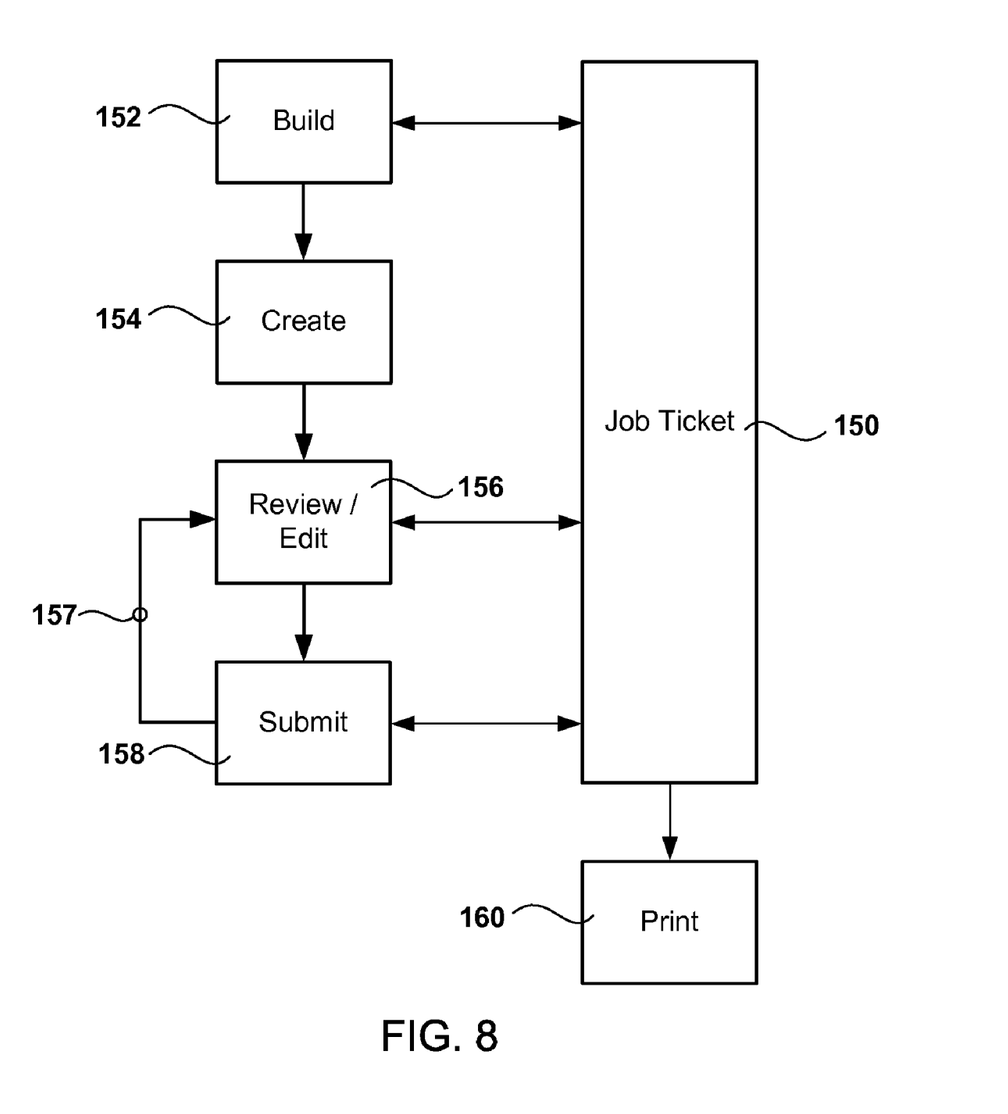
FIG. 8 is a drawing showing embodiments of the present invention comprising document building, creation, editing, and submission from a portable document system residing on a portable memory device.

Some embodiments of the present invention may be described in reference to FIG. 8. A PDS may comprise a plurality of application modules residing on a portable memory device. The PDS may further comprise data files residing on the portable memory device. The data files may be protected or unprotected. The PDS may also comprise a job ticket structure where each job generated using the PDS may have an associated job ticket 150. The job ticket 150 may comprise user and account information, job delivery information, and printing parameters associated with the job. The application modules may enable users to build 152, create 154, review or edit 156, and submit 158 a print job that meets the requirements of a print provider.

After insertion of the portable memory device into a host, a job preparer, also considered a user, may use the applications of the build module 152 to specify input files and data related to the print job under preparation. The files may be password protected according to the preparer's preference. The build module 152 may create the job ticket 152 associated with the print job being built.

The job creation applications in the create module 154 may locate the files and applications specified in the build 152. Additionally, the job creation applications in the create module 154 may run required desktop publishing or document generation applications, access print drivers, generate output files, and create thumbnails of the document. The create module 154 may spool or hold the job on the portable memory device. The create module 154 may send the thumbnails to the host for display.

The job editing applications of the review/edit module 156 may be used to edit the document and print job created using the applications of the create module 154. Exemplary editing functions include those to re-order document pages, to delete document pages, to insert blank pages in the document, to re-paginate the document, to change print parameters, and to update the job ticket 150.

The submit module 158 may allow the job ticket 150 to be sent to a print-job estimator. The print-job estimator may reside on the portable memory device or at a remote print provider. In some embodiments of the present invention, the submit module 158 may access the remote print provider using an Internet or other communication connection on the host device. The job may be reviewed and updated as required 157. The submit module 158 may allow the preparer to publish the document to a print spooler in the PDS residing on the portable memory device. The job ticket 150 may be updated if necessary.

At a print provider site, a print module 160 comprising a job-print application may locate and process files required to generate the document associated with the print job. Processing may include running required applications, accessing print drivers, and creating thumbnails for review. The document may be printed, delivered, and billed according to the parameters and preferences indicated in the job ticket.

Some embodiments of the invention according to FIG. 8 may be embodied in software applications on a U3-capable USB device. Alternate embodiments may be embodied in software applications on a USB device operating under Microsoft® Vista® Mobile Desktop.

In some embodiments of the present invention, a single job ticket may correspond to multiple print jobs. In some embodiments of the present invention, each print job may be related to a different document. In alternative embodiments, several print jobs may be related to the same document.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A portable document processing method, said method comprising:

detecting an operative connection of a portable memory device to a receiving device;

launching a portable document processing application residing on said portable memory device;

generating an electronic document using said portable document processing application; generating an electronic job ticket using said portable document processing application, wherein said electronic job ticket comprises:

document-specific information comprising a communication link to a storage location associated with a document processing application used to generate said electronic document; and print job information;
storing said electronic document on said portable memory device; and
storing said electronic job ticket on said portable memory device.

2. A method according to claim 1, wherein said document-specific information further comprises application information related to said document processing application used to generate said electronic document.

3. A method according to claim 1, wherein said document-specific information further comprises a source link to a source file used to generate said electronic document.

4. A method according to claim 1, wherein said portable memory device is a Universal Serial Bus memory device.

5. A method according to claim 1, wherein said receiving device is a multi-function peripheral.

6. A method according to claim 1 further comprising sending said electronic job ticket to a print provider to estimate the cost of the print job associated with said electronic job ticket.

7. A method according to claim 1 further comprising receiving a cost estimation of the print job associated with said electronic job ticket.

8. A method according to claim 1 further comprising storing, on said portable memory device, at least one source file used to generate said electronic document.

9. A method according to claim 1 further comprising storing, on said portable memory device, said document processing application used to generate said electronic document.

10. A method for printing a document, said method comprising:
receiving a portable memory device in a printing device;
accessing a job ticket on said portable memory device, wherein said job ticket comprises:
document-specific information comprising a communication link to a storage location associated with a document processing application to generate an electronic document, and
print job information related to a print job associated with said job ticket;
accessing a document file on said portable memory device, wherein said document file is associated with said print job;
generating an output file associated with said print job; and
spooling said output file on said portable memory device.

11. A method according to claim 10, wherein said portable memory device is a Universal Serial Bus memory device.

12. A method according to claim 10, wherein said printing device is a multi-function peripheral.

13. A method according to claim 10, wherein said generating an output file associated with said print job comprises accessing said document processing application at said storage location.

14. A method according to claim 10, wherein said generating an output file associated with said print job comprises accessing a source file residing on said portable memory device, wherein said source file is indicated in said job ticket.

15. A method according to claim 10, wherein said printing device is a printing kiosk.

16. A portable document processing system residing on a portable memory device, said system comprising:
detecting an operative connection of a portable memory device to a receiving device;
a launcher for launching a portable document processing application residing on a portable memory device;
an electronic-job-ticket interpreter for generating an electronic document corresponding to an electronic job ticket using said portable document processing application, wherein said electronic job ticket comprises:
document-specific information comprising a communication link to a storage location associated with a document processing application used to generate said electronic document; and
print job information;
storing said electronic document on said portable memory device; and
storing said electronic job ticket on said portable memory device.

17. A system according to claim 16, wherein said portable memory device is a Universal Serial Bus memory device.

18. A system according to claim 16, wherein said document-specific information further comprises application information associated with said document processing application used to generate said electronic document.

19. A system according to claim 16, wherein said document-specification information further comprises source file information associated with a source file used to generate said electronic document.

20. A system according to claim 16 further comprising a job-cost estimator.

21. A portable document processing system residing on a portable memory device, said system comprising:
a launcher for launching a portable document processing application residing on a portable memory device;
an electronic-document generator for generating an electronic document using said portable document processing application;
an electronic-job-ticket generator for generating an electronic job ticket using said portable document processing application, wherein said electronic job ticket comprises:
document-specific information comprising a communication link to a storage location associated with a document processing application used to generate said electronic document; and
print job information;
storing said electronic document on said portable memory device; and
storing said electronic job ticket on said portable memory device.

* * * * *